Figure 10:
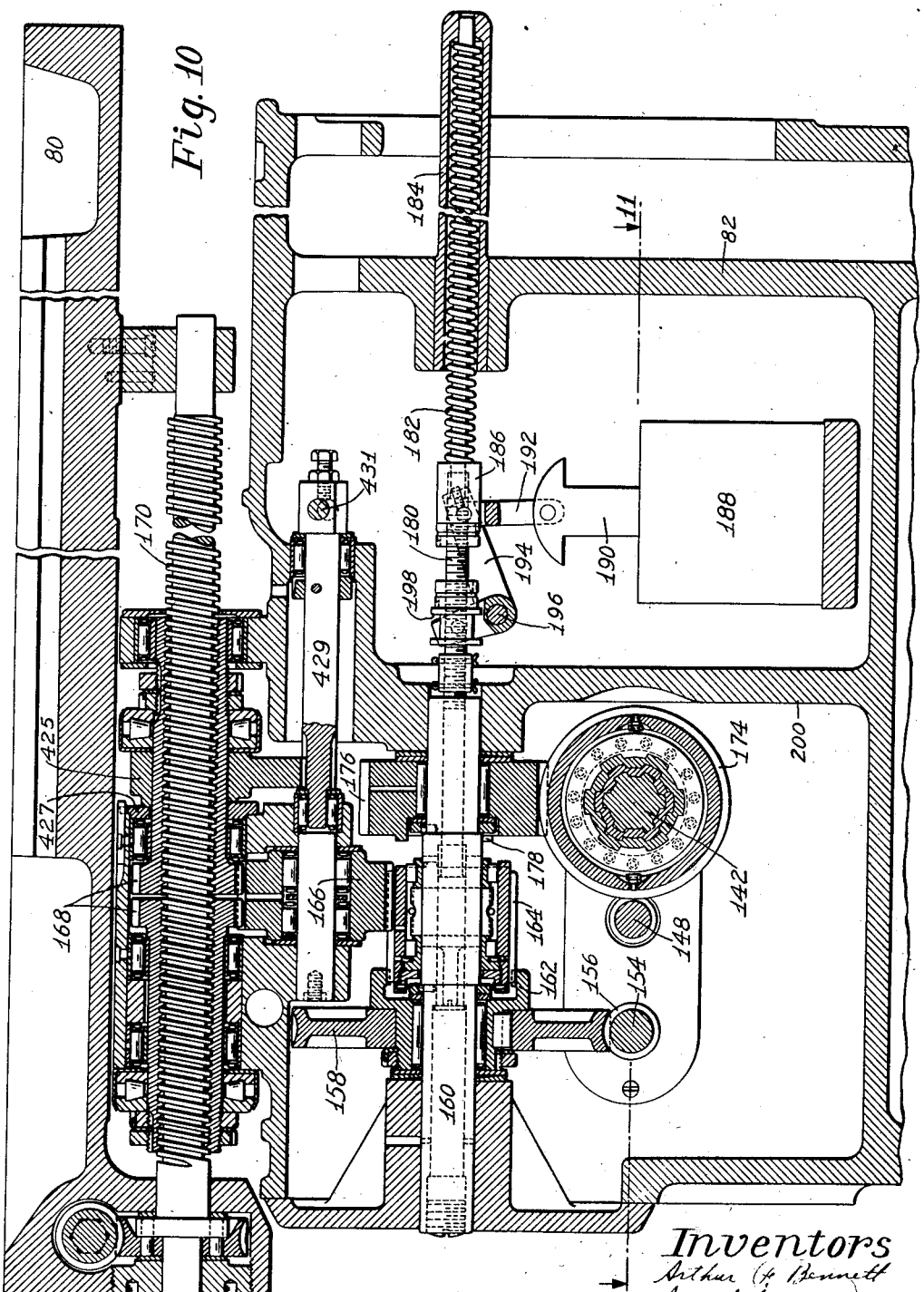

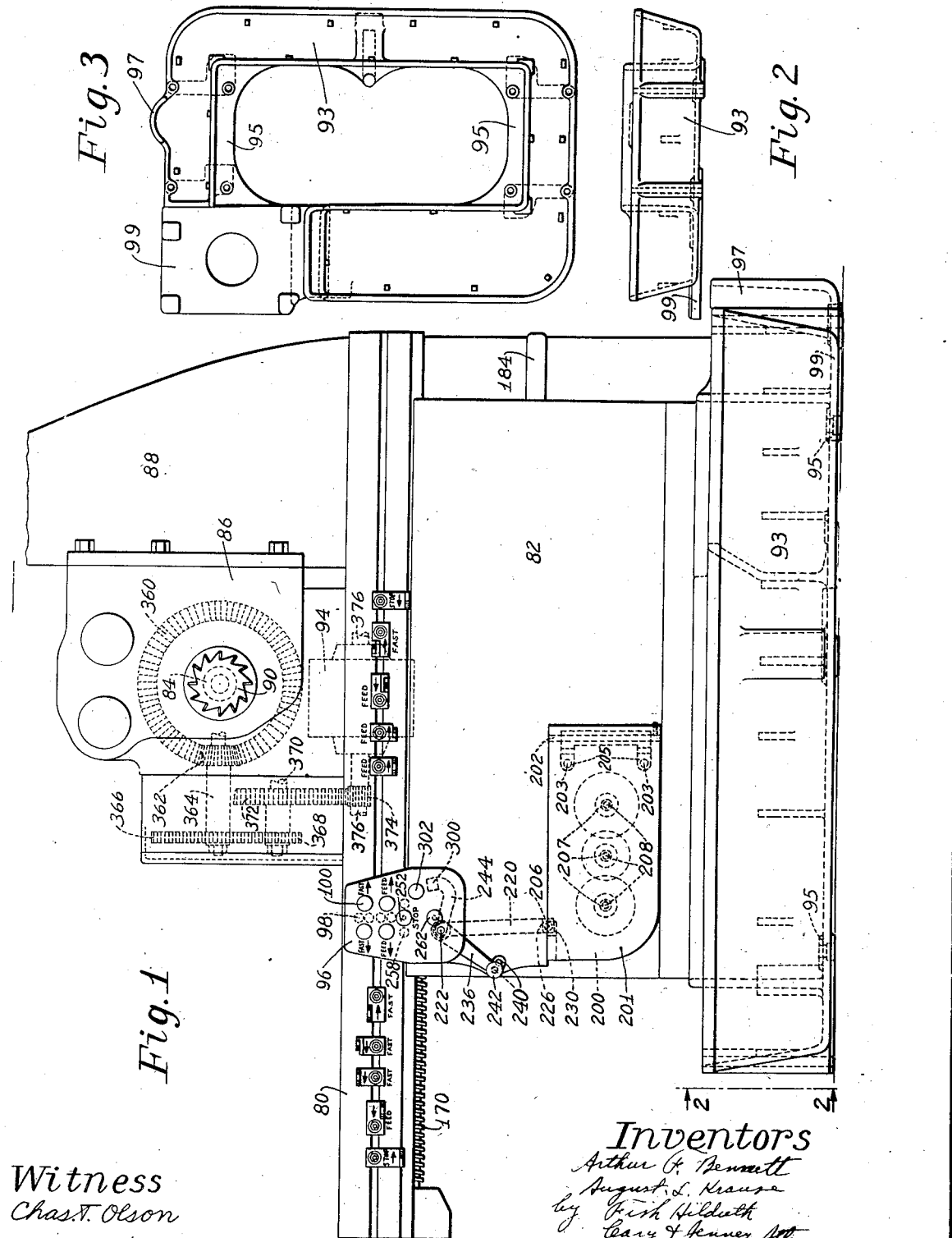

Jan. 26, 1937. A. F. BENNETT ET AL 2,068,840
MILLING MACHINE
Filed Sept. 12, 1934 11 Sheets-Sheet 2
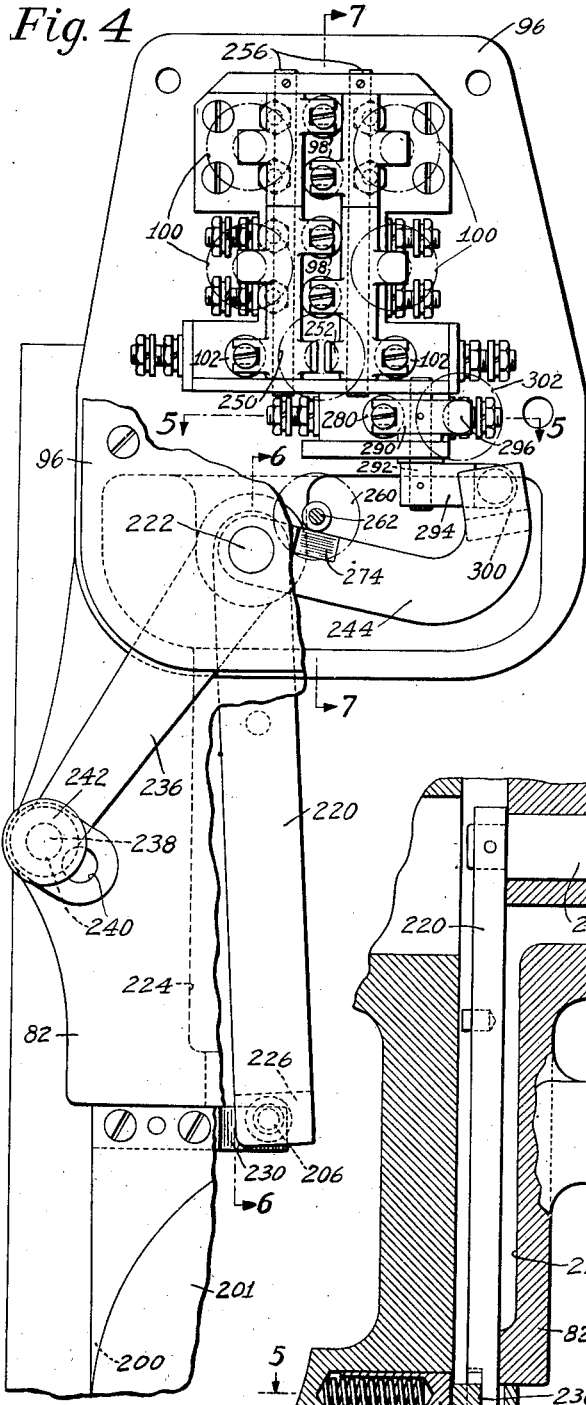
Fig. 4
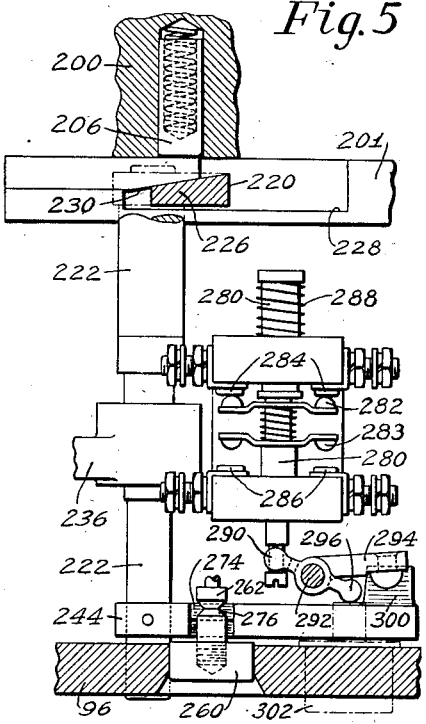
Fig. 5
Fig. 6
Witness
Chas. T. Olson
Inventors
Arthur F. Bennett
August L. Krause
by Cook Hildreth
Cary & Jenney Attys.

Jan. 26, 1937.  A. F. BENNETT ET AL  2,068,840
MILLING MACHINE
Filed Sept. 12, 1934    11 Sheets-Sheet 3
Fig. 7
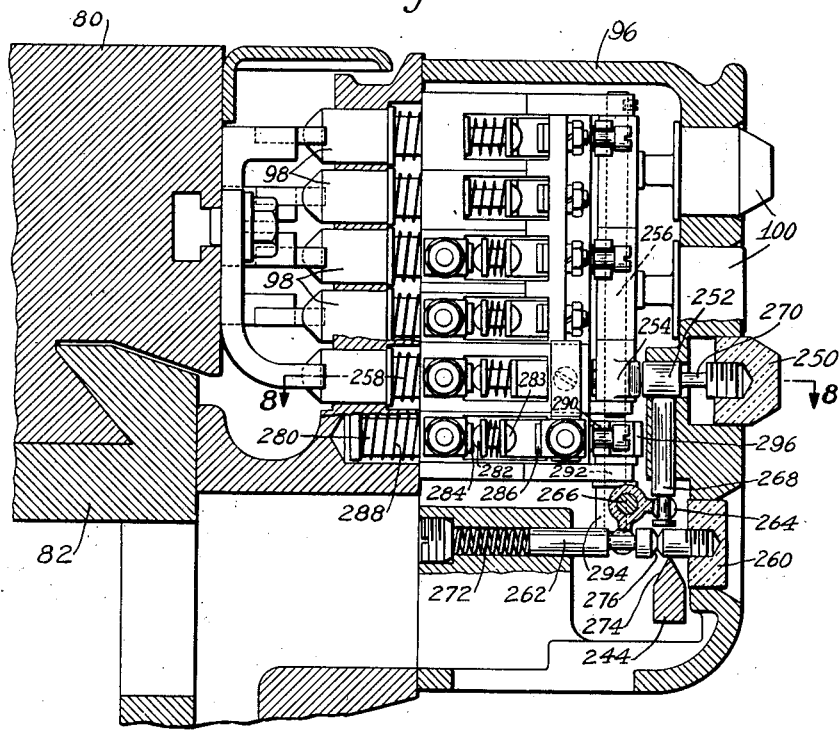
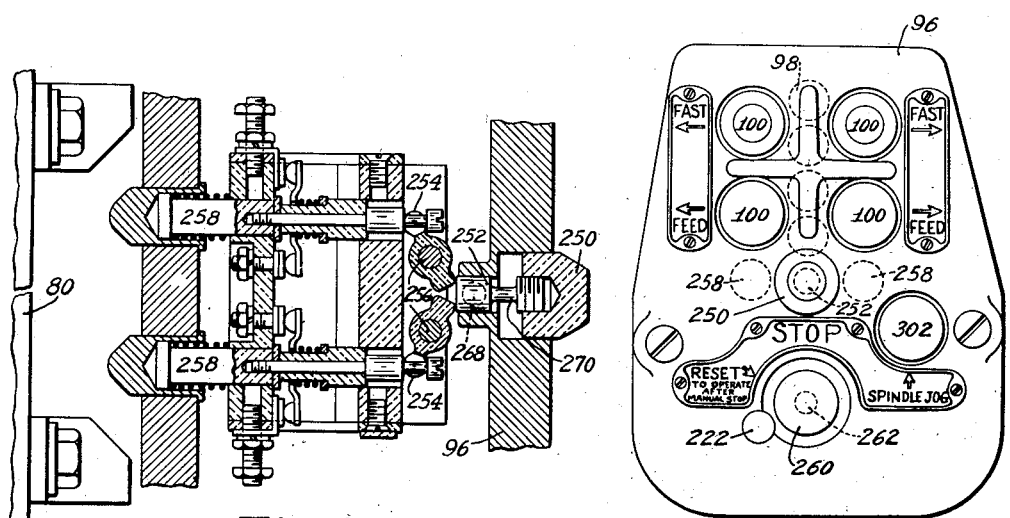
Fig. 8    Fig. 9
Witness
Chas. T. Olson
Inventors
Arthur F. Bennett
August L. Krause
by Fish, Hildreth,
Cary & Jenney Attys.

Jan. 26, 1937.  A. F. BENNETT ET AL  2,068,840
MILLING MACHINE
Filed Sept. 12, 1934    11 Sheets-Sheet 5

Witness
Chas. T. Olson

Inventors
Arthur F. Bennett
August S. Krause
by Fish Hildreth
Cary & Jenny Attys.

Jan. 26, 1937.　　A. F. BENNETT ET AL　　2,068,840
MILLING MACHINE
Filed Sept. 12, 1934　　11 Sheets-Sheet 6

Witness
Chas. T. Olson

Inventors
Arthur F. Bennett
August L. Krause
by Fish Hildreth
Cary & Jenney Attys.

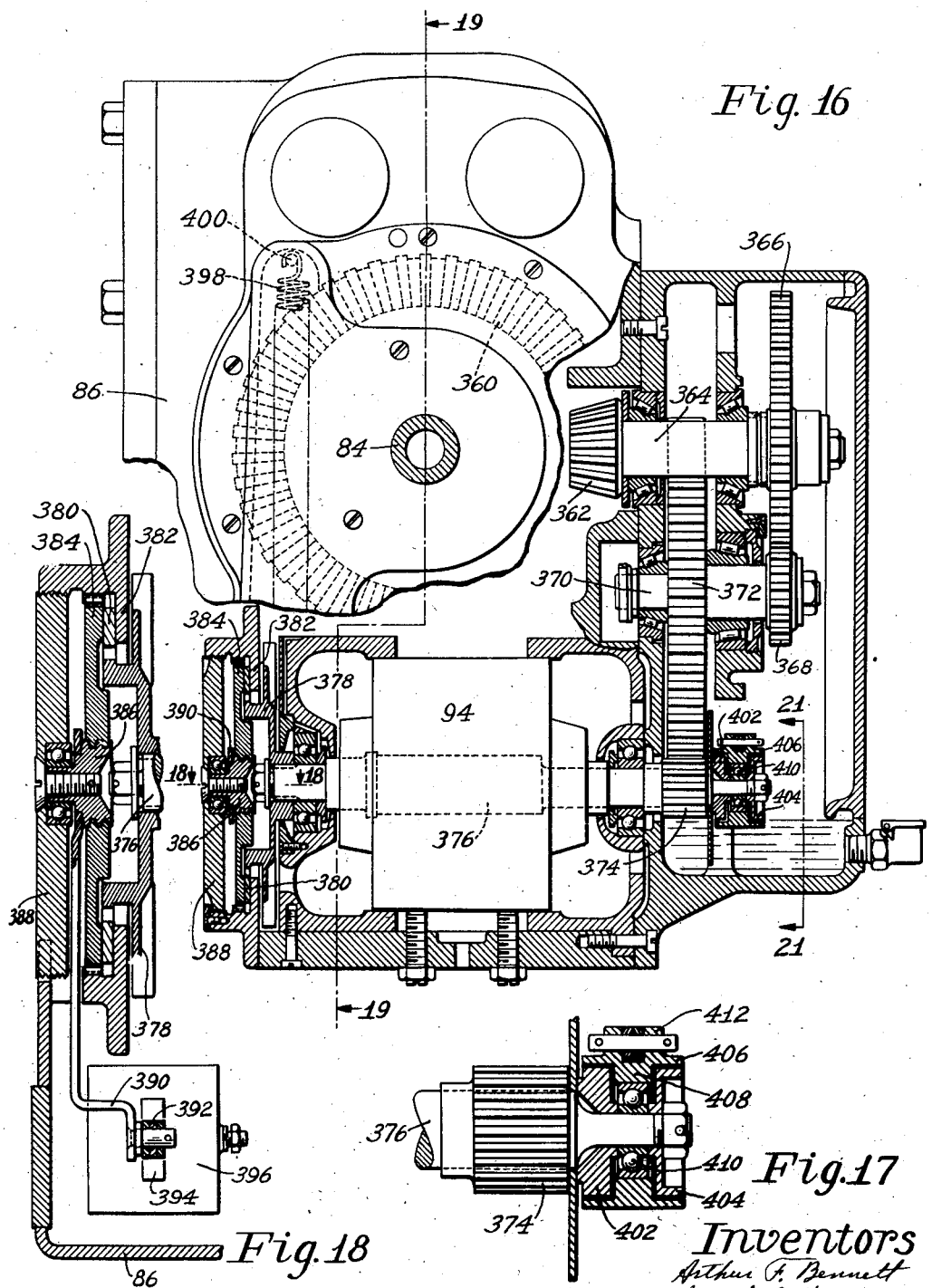

Jan. 26, 1937.  A. F. BENNETT ET AL  2,068,840
MILLING MACHINE
Filed Sept. 12, 1934  11 Sheets—Sheet 8
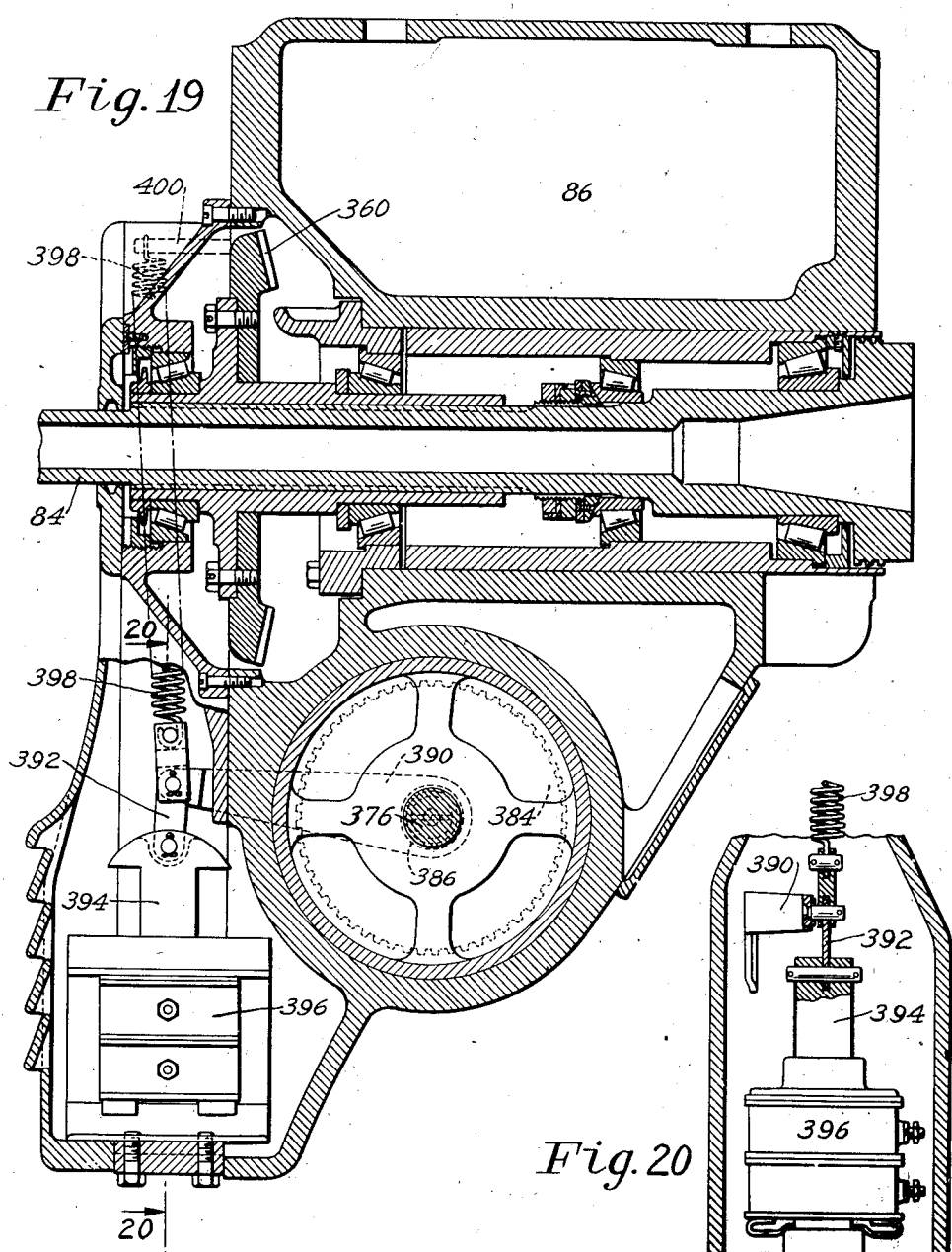
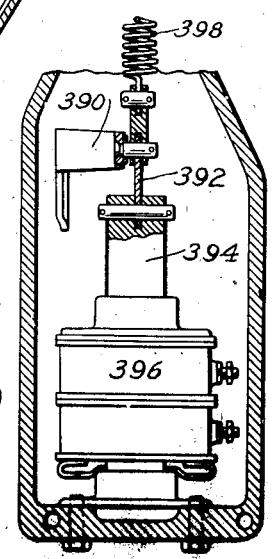
Witness
Chas. T. Olson
Inventors
Arthur F. Bennett
August L. Krause
by Fish Hildreth
Cary & Jenney Attys.

Jan. 26, 1937. A. F. BENNETT ET AL 2,068,840
MILLING MACHINE
Filed Sept. 12, 1934 11 Sheets-Sheet 9
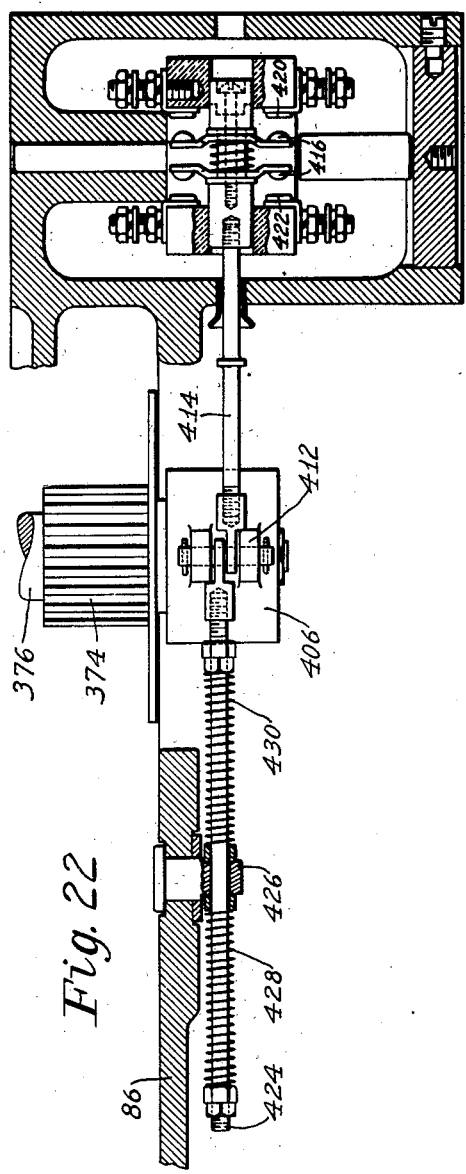
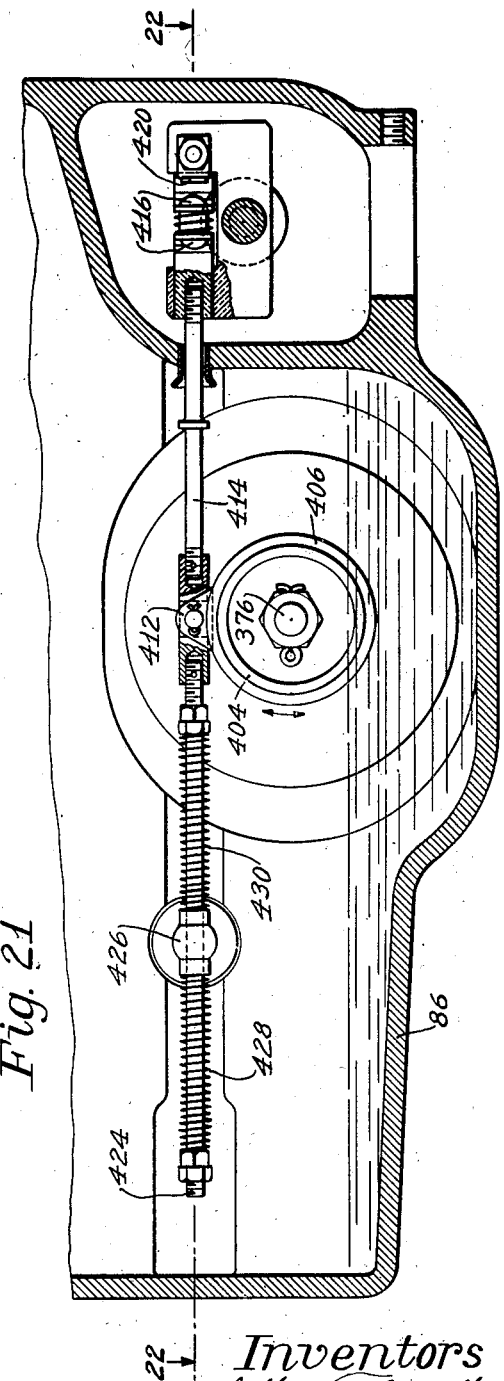
Witness
Chas. T. Olson
Inventors
Arthur F. Bennett
August L. Krause
by Fish Hildreth
Cary & Jenney Attys.

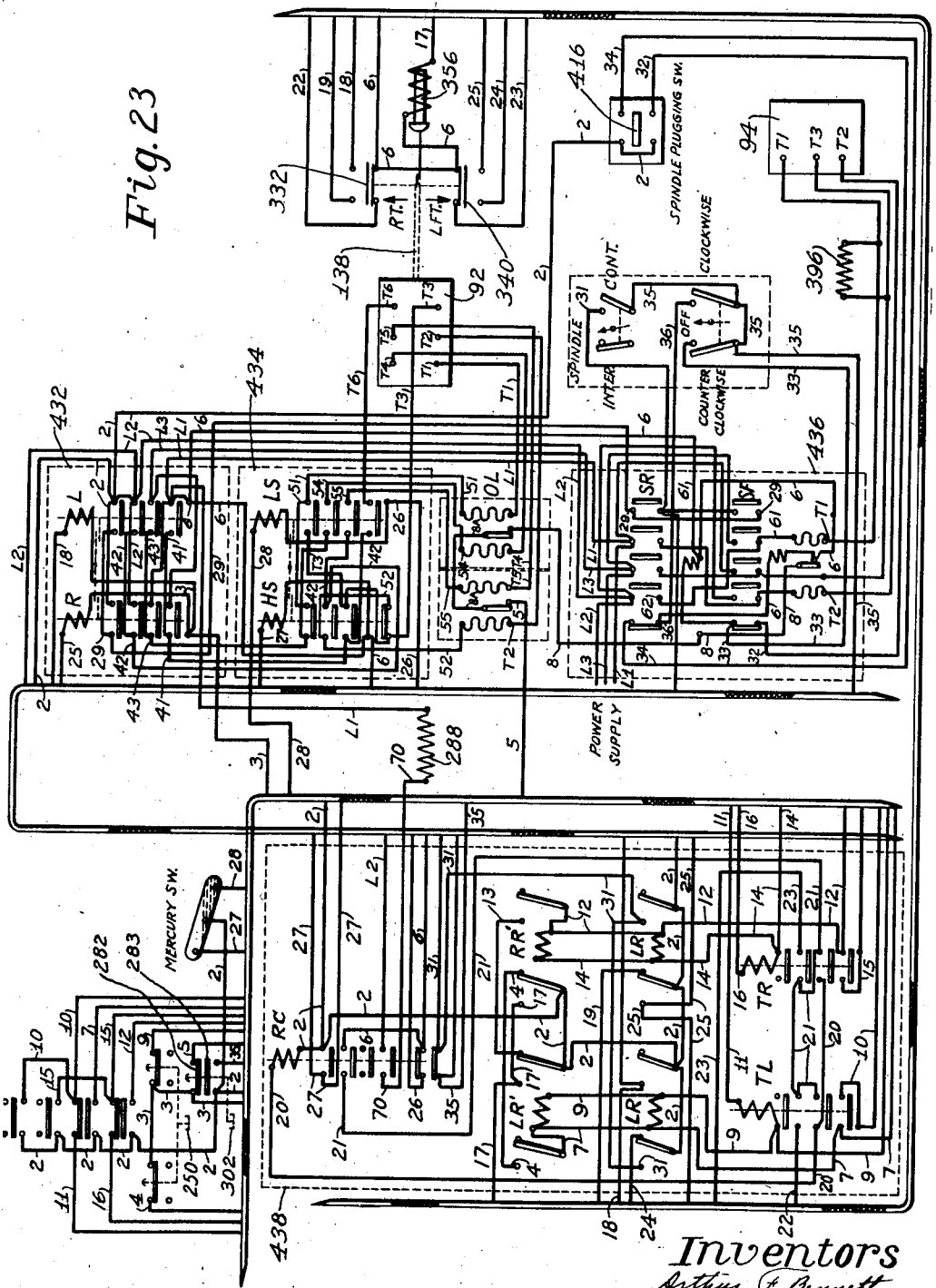

Jan. 26, 1937.  A. F. BENNETT ET AL  2,068,840
MILLING MACHINE
Filed Sept. 12, 1934   11 Sheets-Sheet 11

Patented Jan. 26, 1937

2,068,840

UNITED STATES PATENT OFFICE 2,068,840

MILLING MACHINE

Arthur F. Bennett, West Barrington, and August L. Krause, Providence, R. I., assignors to Brown and Sharpe Manufacturing Company, a corporation of Rhode Island Application September 12, 1934, Serial No. 743,652

36 Claims. (Cl. 90—21)

The present invention relates to improvements in milling machines, and is herein disclosed as embodied in a manufacturing type of milling machine including a work supporting table, electrically driven and mounted on ways on a fixed base, together with a cutter spindle which is also electrically driven and is mounted on a carriage for vertical adjustment toward and away from the table.

It is a principal object of the present invention to provide novel and improved means for controlling the operation of the work supporting table and cutter spindle to permit a more efficient and safe manipulation of the machine by the operator, and also to insure a high degree of efficiency and accuracy in operation.

It is a further object of the invention to provide certain novel and improved features of construction and operation of the several cooperating mechanisms of the machine to produce a better and more efficient machine.

With these and other objects in view, as may hereinafter appear, certain features of the invention are concerned with the provision of a novel and improved electrical control mechanism for the machine, and more specifically with the provision of an improved switch mechanism for controlling the starting and stopping of the table and spindle motors.

In order to secure a more accurate control in the stopping of the relatively high speed motors utilized, one feature of the invention consists in the provision of a novel and improved viscosity switch which may be mounted directly on the armature shaft of the motor, and is well adapted for consistent and efficient operation at the high speed of rotation developed by the motor shaft.

Another feature of the invention consists in the provision of electrical control mechanism for controlling the operation of a viscosity plugging switch to prevent over-travel of the switch mechanism in plugging the motor to a stop, with a consequent tendency for the motor to kick in a reverse direction.

Another feature of the present invention consists in the provision of a control mechanism for braking the cutter spindle to a stop which utilizes the braking force of the motor, and causes a mechanical brake to be applied only after the motor and spindle driven thereby have been appreciably slowed down to reduce so far as possible the wear on the brake linings.

Certain other features of the invention consist in the provision of a novel safety stop switch for the table motor and a jog switch for the spindle motor which serve to permit a more versatile and complete control of the operation of the machine by the operator.

Another feature of the present invention consists in the provision of a novel and improved pick-off gear case which is well adapted to facilitate the changing of gears, and is so arranged as to prevent movement of the table driving connections including the gears under power with possible injury to the operator while the gear case is open.

Figure 11:
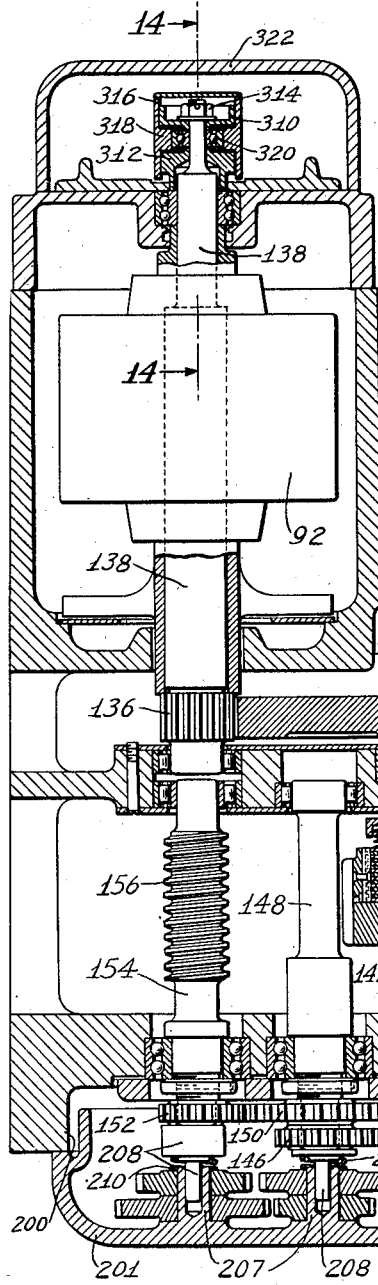
Figure 12:
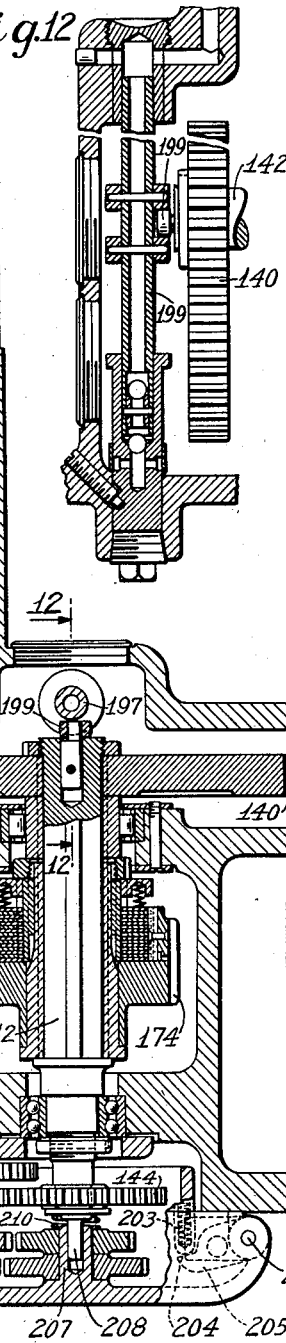
Figure 13:
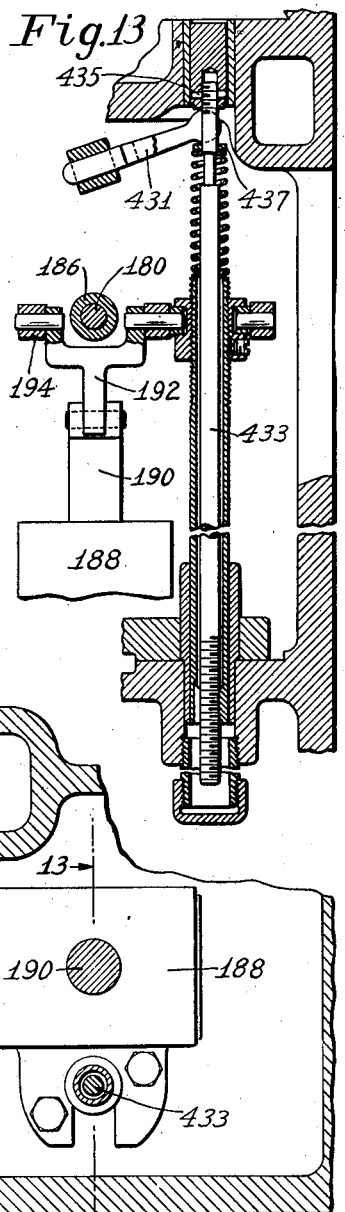
Figure 14:
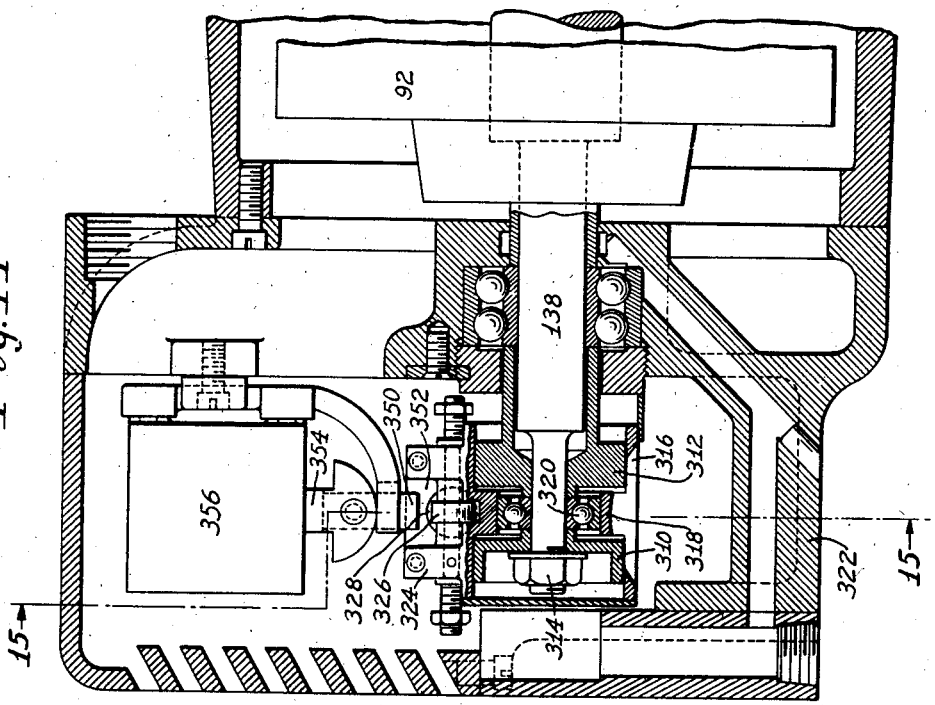
Figure 15:
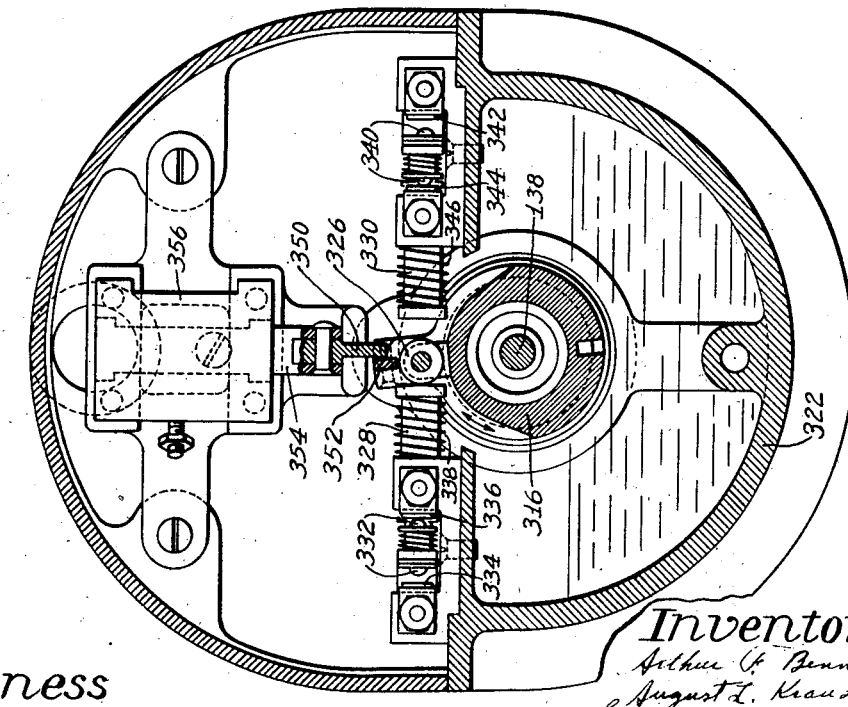

The several features of the present invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a manufacturing type milling machine; Fig. 2 is a detail end view of the auxiliary base or coolant trough; Fig. 3 is a plan view of the coolant trough shown in Fig. 2; Fig. 4 is a detail view in front elevation illustrating particularly the control box and switches contained therein for controlling the operation of the table, with mechanism for stopping the table upon opening of the pick-off gear casing; Fig. 5 is a detail sectional view taken on the line 5—5 of Fig. 4; Fig. 6 is a detail sectional view on the line 6—6 of Fig. 4; Fig. 7 is a detail sectional view taken on the line 7—7 of Fig. 4; Fig. 8 is a detail sectional plan view taken on the line 8—8 of Fig. 7; Fig. 9 is an enlarged detail view of the face of the control box; Fig. 10 is a detail sectional view in front elevation illustrating particularly the driving connections for operating the table; Fig. 11 is a sectional plan view taken on the line 11—11 of Fig. 10; Fig. 12 is a detail sectional elevation taken on the line 12—12 of Fig. 11; Fig. 13 is a detail sectional elevation taken on the line 13—13 of Fig. 11; Fig. 14 is a detail sectional view taken on the line 14—14 of Fig. 11; and Fig. 15 is a sectional view taken on the line 15—15 of Fig. 14.

Figure 24:
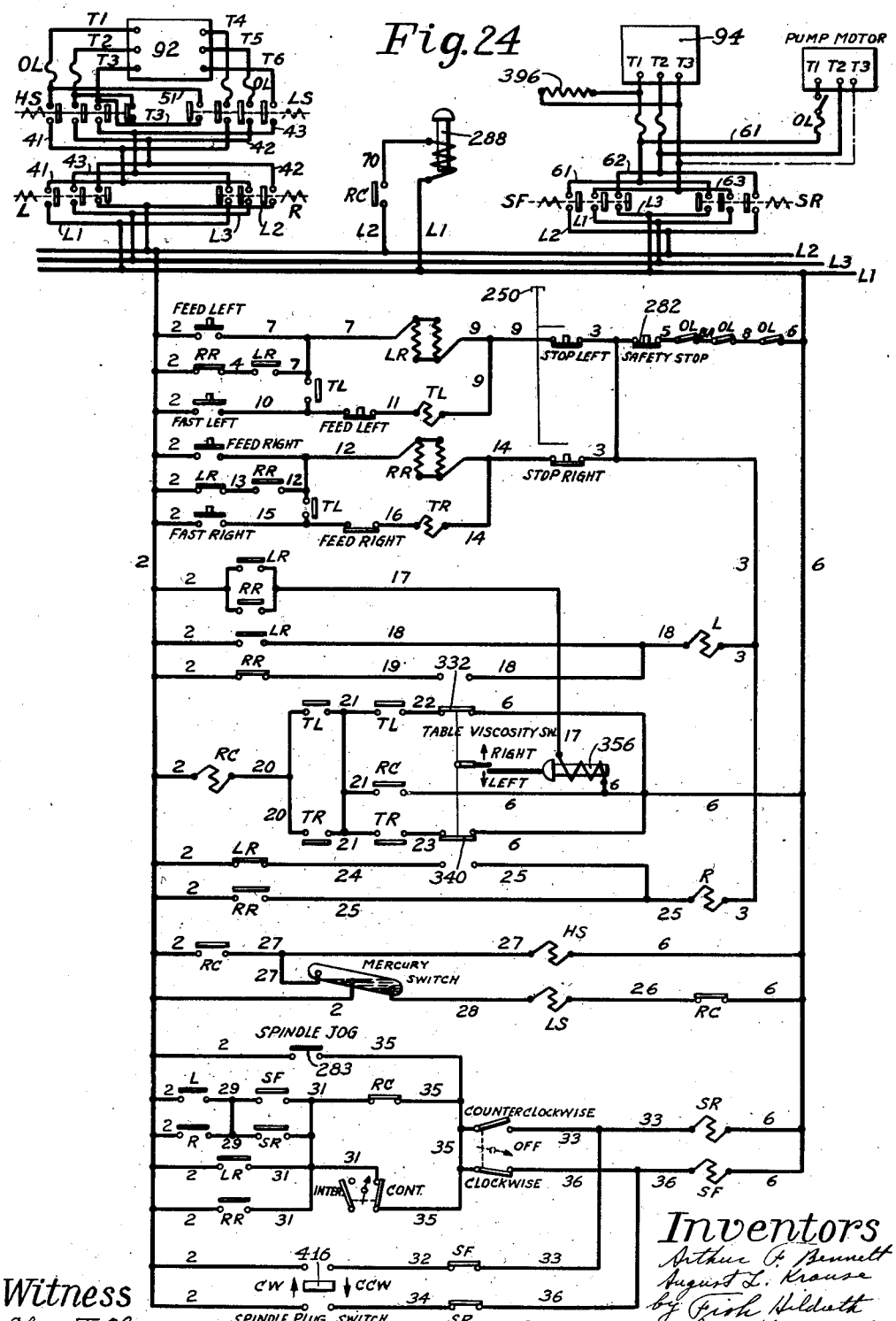

Fig. 16 is a view in rear elevation partly in section of the cutter spindle unit including the spindle motor and driving connections; Fig. 17 is an enlarged detail sectional view of the viscosity switch shown in Fig. 16; Fig. 18 is an enlarged detail sectional plan view of the spindle motor brake taken on the line 18—18 of Fig. 16; Fig. 19 is a sectional view taken on the line 19—19 of Fig. 16; Fig. 20 is a detail sectional view of the spindle motor brake solenoid taken on the line 20—20 of Fig. 19; Fig. 21 is an enlarged view in side elevation of the spindle motor viscosity switch taken on the line 21—21 of Fig. 16; Fig. 22 is a sectional plan view taken on the line 22—22 of Fig. 21; Fig. 23 is a diagrammatic view of the electrical connections for controlling the operation of the table and cutter spindle; and Fig. 24 is an explanatory diagram of the electrical connections illustrated in Fig. 23.

The milling machine herein disclosed as embodying the several features of the present invention, comprises a transversely movable work supporting table and a rotary cutter spindle separately driven by means of electric motors which are controlled through electrical connections adapted to permit a high degree of flexibility of control both for automatic and manual operation of the machine.

In order to secure the high degree of accuracy and uniformity of performance required of machines of this type, it is necessary to drive the table at all times at a uniform rate, and to bring the table to an abrupt stop at an exactly determined position, as for instance, where a milling operation is being performed against a shoulder. With the construction herein disclosed, these results are attained through the control of the table motor which is driven at a relatively high rate of speed, and operates through reduction gearing to move the table at the relatively slow rate required for the most efficient operation of the cutter. In order to stop the motor as rapidly as possible at the end of the table travel in either direction, electrical connections have been provided which will operate either in stopping or reversing the direction of the table drive to electrically reverse the motor and thus apply a powerful braking action on the motor until it has been brought substantially to rest. To bring the machine to a stand-still or to reverse and simultaneously to shift the intermediate gearing to a quick traverse position, an extremely accurate and sensitive control of the main motor switch is required to brake the machine to a stop without causing the motor to mechanically reverse or to kick with possible injury either to the work being performed, or to the machine itself. To meet this requirement, in carrying out the present invention, a novel and improved plugging or braking switch control mechanism has been developed which is extremely sensitive to the direction and rate of rotation of the motor to insure the bringing of the motor to a dead stop, and also operates to provide an accurate control for the shift to a quick traverse in an opposite direction if so desired.

A feature of the present invention comprises a novel and improved viscosity switch which is adapted to be directly connected to the armature shaft of the table motor, and to give uniform and efficient performance at the high speed of operation attained by the motor, so that an extremely accurate and sensitive switch control is obtained which is controlled directly by the rate and direction of rotation of the motor. In order to prevent overtravel of the switch mechanism and a consequent kicking of the motor in an opposite direction as the table is brought to rest, a plunger or detent is provided which is electrically controlled by means of a solenoid, and is arranged in stopping the machine to drop into position to prevent the movement of the viscosity switch in an opposite direction past neutral position. The electrical connections for controlling the solenoid and plunger are so arranged as to hold the plunger in an inoperative position during the movement or reversal of the table, and permits the plunger to move into the path of the switch only when the stop button has been pressed to bring the machine to a dead stop.

The viscosity switch employed in carrying out the present invention is supported directly on the motor shaft, and is constructed and arranged to provide a relatively large peripheral surface which is immersed in oil, and is quite unaffected by the speed of rotation of the rotating member.

In order to brake the spindle and the motor connected thereto to a quick stop, a viscosity switch somewhat similar in form to that employed for the table motor has been mounted on the armature shaft of the spindle motor, and is connected so that in stopping the spindle, the spindle motor may be electrically reversed until the motor and spindle driven thereby are brought substantially to a standstill. To further assist in stopping the spindle motor, there is also provided a mechanical brake which is mounted at one end of the spindle motor, and operates directly on the motor shaft. With the present construction, electrical connections are provided which are arranged to permit the application of the mechanical brake only after the motor has been brought to a substantial stop by the operation of the plugging switch above described. With this construction and mode of operation, excessive wear on the mechanical brake is avoided, while at the same time the spindle is brought quickly and surely to a stop, and is firmly held against subsequent movement in either direction by the operation of the mechanical brake. This arrangement has the further advantage that the mechanical locking of the spindle against movement prevents any rocking of the parts which might cause the motor to kick.

In accordance with another feature of the invention, the pick-off gears utilized for adjusting the rate of feed of the table, are housed within a casing which is constructed and arranged to permit access by the operator thereto, only when the table motor is entirely disconnected, so that there is no possibility of injury to the operator through the kicking or movement of the motor and the gears.

In order further to facilitate the setting up of the machine by the operator for different jobs, the pick-off feed gear casing is provided with a hinged door within which are provided a number of pins for the storage of additional pick-off gears. Supported on each of the pins referred to, are spring-pressed plungers which are arranged when the casing cover is closed, to perform the double function of holding the operating pick-off gears in position on the ends of the operating shafts, and to clamp the stored gears tightly in place to prevent possible rattling from the vibration of the machine.

Referring more specifically to the drawings, the work supporting table of the machine as indicated at 80 is mounted for lateral movement on ways formed on the base 82 of the machine. The milling cutter spindle as designated at 84 is rotatably mounted in a support 86 which is vertically adjustable with relation to the machine column 88. As shown in Fig. 1, a milling cutter 90 of ordinary description, is mounted in operative position on the cutter spindle 84. The table is driven by means of an electric motor 92 through driving connections more fully to be hereinafter described. The cutter spindle is driven by means of an electric motor 94 which forms an integral part of the spindle cutting unit mounted in the support 86.

As best illustrated in Figs. 1, 2 and 3 of the drawings, the machine base 82 is placed within a coolant trough 93 which extends across the front of the machine, and along the sides and rear into engagement with the lower end of the machine column 88. The coolant trough is provided along its inner bottom edge with two flanges 95 which provide a support for the machine base, and also serve to assist in supporting the coolant trough in close engagement with the machine base, so that any coolant which may be used with certain types of milling operation, will be caught and directed into the trough as it flows down the sides of the machine base 82 from the point where it is applied to the work at the point of cutting contact of the milling cutter. As will readily be seen from Fig. 1 of the drawings, the inner walls of the coolant trough fit snugly against the base of the machine, so that the coolant will be drained off entirely away from the base of the machine to avoid so far as possible any corrosion of the machine which might arise from continued contact with the coolant. The outer wall of the trough or vessel 93 has been extended at 97 to provide for the mounting of a coolant pump of ordinary description in the trough.

In order to provide a level support for the machine column there is also provided a filler plate 99 which is attached to the bottom edge of the coolant trough and extends under the column. Four bosses are formed on the corners of the filler plate to receive the weight of the machine.

The machine herein disclosed is controlled through electrical connections which are arranged to control the operation of the two-speed reversible driving motor for the table, and also the spindle motor, to secure a simple and efficient control of these elements, for the power operation of the machine, by the operator or automatically by means of dogs mounted on the work supporting table. The rate and direction of the movement of the table is controlled by means of a simple arrangement of switch control buttons which comprise left and right feed buttons and left and right quick traverse buttons. These buttons are mounted as indicated in Figs. 1 and 7, in a control post 96 which is located adjacent one side of the table. These buttons are arranged in two series, and comprise four buttons 98 mounted in vertical alignment on the table side of the control post to cooperate with corresponding dogs on the table to control the direction and rate of feed of the table, and a second series of manually controlled buttons 100 mounted on the opposite side of the control post to permit the convenient operation of the controls by hand. Two additional stop buttons 102 are provided for engagement with corresponding dogs on the table to positively limit the movement of the table in either direction. The general features of the electrical control system outlined above are similar to those illustrated and described in the copending application of Graves and Bennett, Serial No. 714,809, filed March 9, 1934, and will not therefore be further described, except in so far as necessary in connection with the subsequent description of the electrical diagrams Figs. 23 and 24 of the drawings illustrating the several features of the present invention.

As best shown in Figs. 1, 10 and 11, the table 80 is driven from the motor 92 through driving connections of ordinary description which include slow feed and quick traverse gear trains. These connections include a pinion 136 mounted on the armature shaft 138 of the motor, and adapted to mesh with a large pinion 140 on a parallel operating shaft 142. On the forward end of the shaft 142 is mounted a pick-off gear 144 which meshes with a corresponding pick-off gear 146 on a short operating shaft 148. A second pick-off gear 150 on the shaft 148 engages with a gear 152 on an operating shaft 154 which carries a driving worm 156. Meshing with the worm 156 is a worm gear 158 which is loosely mounted to turn on a shaft 160, and has also formed thereon an internal clutch gear 162 adapted to engage with a sliding clutch member 164. The clutch member 164 is continuously in mesh with an idler gear 166 which meshes in turn with a split feed nut 168 screw-threaded on a feed screw 170 which is in turn supported against axial movement with relation to the table 80. The table may be driven alternatively at a quick traverse rate through gear connections which include a spiral gear 174 on the shaft 142, and a spiral gear 176 which is loosely sleeved to turn on the shaft 160 and has formed on one face thereof a clutch member 178 adapted to engage with a corresponding clutch face on the clutch member 164. The position of the clutch member 164 is controlled by means of a control rod 180 which is journalled within the shaft 160, and is keyed for axial movement with the clutch member. A spring 182 coiled within a sleeve 184 fitted over one end of the control rod 180 and adapted to bear against a block 186 secured to the control rod, tends normally to push the rod and the clutch to the left as shown in Fig. 10, to maintain the clutch normally in its slow feed position. In order to shift the clutch to its quick traverse position, a solenoid indicated at 188 in Fig. 10, is provided with a plunger 190 connected by means of a link 192 with a bell-crank clutch control lever 194 which is mounted to turn about a pivot 196, and is provided with a yoke and a collar secured thereto, which rides in a corresponding annular groove 198 on the control rod 180.

An oil pump for supplying lubricant to the various parts of the machine is illustrated in Figs. 11 and 12. This pump comprises a hollow piston rod 197 which is actuated by an eccentric pin 199 secured in the end of the shaft 142 and engaging between two collars secured to the piston rod.

The pick-off gears are contained within a casing 200 which is provided with a cover 201 arranged to swing about a pivot 202 (see Figs. 1 and 11). Two spring-pressed plungers 203 seated in recesses formed in the casing 200 adjacent the pivot 202 are arranged for engagement with bearing surfaces 204 on a bearing member or plate 205 adjustably secured to turn with the cover 201 about the pivot 202, so that the cover when released will tend automatically to swing to an open position. An additional spring plunger 206 (see Figs. 1, 4 and 6), similarly seated in a recess in the casing is arranged for yielding engagement with the opposite side of the cover 201 at a point adjacent the locking device hereinafter to be described. The spring plungers 203 and 206 perform an additional function of taking up any possible play which may be present in the pivot or lock for the cover 201 and thus prevent any possible looseness or rattling of the parts.

The casing is provided with three supporting pins 207 for storing additional pick-off gears, these pins being located in alinement respectively with the three operating shafts 142, 148 and 154.

Each pin is journalled to receive a plunger 208 which is provided at its outer end with an enlarged head to engage with the corresponding pick-off gear supported in operative position on the end of the corresponding operating shaft. A coil spring 210 is mounted on each plunger 208 bearing at one end against the head of the plunger and at its other end against the pick-off gears stored on a pin 207, so that the springs perform the double function of holding the operative pick-off gears in position on the ends of their respective shafts, and also maintain the stored gears firmly in position against the base of the pins 207 to prevent possible shifting or rattling of the gears when the casing cover 201 is in its closed position.

With the present construction, the casing cover 201 is normally held in closed position by means of a locking device which is interconnected with a stop switch in the main connections to the table motor, so that it can be released to permit the opening of the cover 201 only after the switch has been moved to open or stop position. The locking device comprises a locking lever 220 (see Figs. 1, 4, 5 and 6) which is secured at its upper end to a rock shaft 222 and extends downwardly through an aperture 224 formed in the machine casing. At its lower end the locking lever 220 is provided with a wedge-shaped projection 226 which is arranged to extend within a recess 228 formed in the upper left hand corner of the cover 201 as viewed from the front of the machine, and to move into locking engagement with a correspondingly shaped groove 230 at one end of the recess 228 to lock the cover in closed position. The position of the locking lever 220 may be controlled manually to lock or release the cover by means of a hand lever 236 which is also rigidly secured to the rock shaft 222, and carries at its free end an axially movable detent pin 238 adapted to engage with either of two holes 240 corresponding to the open and closed positions of the locking lever 220. A knurled handle 242 is fitted to the forward end of the detent pin 238 to permit the detent pin 238 to be conveniently withdrawn or fitted into either of the holes 240.

In accordance with one feature of the invention a mechanical interlock is provided between the mechanism for locking the pick-off gear cover in place and the stop switch connections for the table motor which is so arranged as to prevent the operation of the locking lever to open the cover until after the manually operable stop button provided with the present machine has been pressed to disconnect the table drive, and is further arranged so that the movement of the locking lever to open position will operate automatically to open a special safety stop switch to wholly disconnect the table motor from its source of electrical supply as hereinafter more fully described.

The mechanical interlock between the manually operable stop switch referred to, and the locking lever 220 for the pick-off gear cover 201 is arranged to prevent the opening of the cover 201 except when the switch is open, and prevent the closing of the switch until after the locking lever has been returned to locking position. To this end there is also secured to the rock shaft 222 to move with the locking lever 220, a laterally extending arm 244 which is mechanically connected to the manually operable stop switch as hereinafter more fully described.

The manually operable stop switch for the table motor, as best shown in Figs. 1 and 4 to 9 inclusive, comprises a stop button 250 which is mounted on the outer end of a plunger 252 which at its inner end engages with two switch levers 254 which are mounted to turn respectively on the vertical pivot posts 256, and engage at their free ends with the usual stop switch contact plungers 258. Directly below the stop button 250 there is provided a reset button 260 which is mounted on the outer end of a spring-pressed reset plunger 262. The plunger 262 is connected by a small bell-crank 264 pivoted at 256 to the lower end of a vertical plunger 268 which is arranged to bear at its upper end against the stop button plunger 252. When the manual stop button 250 is pressed, causing the plunger 252 to be moved inwardly, an annular groove 270 in the plunger 252 is brought into alignment with the vertical plunger 268, so that the plunger 268 is permitted to move upwardly, and the reset plunger 262 and reset button 260 to move outwardly under the pressure of their spring 272, thus locking the switch connections in stop position until the reset button shall again have been pushed inwardly, causing the plunger 268 to be moved downwardly to release the stop button 250. During the normal operation of the machine with the reset button 260 and plunger 262 in the retracted position illustrated, for instance, in Fig. 7, the locking lever 220 is held positively in locking position by the engagement of a V-shaped section 274 of the horizontal lever arm 244 with the plunger 262. However when the reset button is permitted to move outwardly upon the pushing of the stop button 250, as above described, a V-shaped groove 276 in the plunger 262 is brought into alignment with the V-shaped portion 274 of the lever arm 244, so that the locking lever 222 may be moved about its pivot into open position. With this arrangement of the parts, it will readily be seen that it is impossible again to move the reset button inwardly until the locking lever 220 has been again returned to its locking position, thus reducing to a minimum the possibility that the machine may be accidentally started before the operator has completed the operation of setting up the machine.

With the construction and arrangement of the electrical controls for the work supporting table herein described and illustrated, and particularly with the plugging switch connection disclosed, it has been found even with the machine in stopped position with the manual stop button engaged as above described, that the accidental rotation of the spindle motor can act to close one of the plugging switch contacts, and thus cause the motor to kick. In order to avoid any possibility of having the motor kick while the operator is changing or adjusting the pick-off gears above described, there is also provided with the present construction, a safety stop switch which is controlled automatically by the movement of the pick-off gear cover locking lever 220 to open position, to disconnect the main controls for the table motor, so that the motor cannot start or run when the switch is open. This switch is entirely independent of the switch contacts above described which are controlled by the stop button 250.

With the present construction, the movement of the locking lever 220 to open position to permit the opening of the pick-off gear casing cover 201, is also arranged to open the switch contacts for the table motor. As best shown in Figs. 4, 5 and 6 of the drawings, the "safety stop" switch comprises a switch contact plunger 280 with movable contact arm 282 which is arranged for engagement with the corresponding stationary contactors 284. A spring 288 coiled about the rear end of the plunger 280 tends normally to maintain the switch in closed position with the contact arm 282 in engagement with the stationary contact member 284. The position of the switch plunger 280 is controlled by means of a lever 290 which is adapted to turn about a pivot 292 and has formed on the hub thereof an arm 294 which is adapted for engagement with a cam surface 300 formed on the end of the laterally extending locking lever arm 244. The movement of the locking lever 220 to its open position, causes the cam-shaped portion 300 of the lever arm 244 to engage with and swing the lever arm 294 about its pivot to disengage the safety stop switch members 282 and 284, thus disconnecting the switch contact leads 3—5 as shown in the electrical diagrams Figs. 23 and 24, to wholly disconnect the table motor.

With the present construction there is also provided a "spindle jog" button to enable the operator to rotate the spindle by power when the table is at rest. The spindle jog button 302 (see Figs. 1, 4, 5 and 9) is mounted on the control posts 196, and is adapted for engagement with an arm 296 which forms a part of the lever 290 controlling the position of the plunger 280. The pressing of the spindle jog button 302 by the operator, causes the rear end thereof to engage with the arm 296 to rotate the switch lever 290 to the fullest extent about its pivot against the pressure of the spring 288 to engage a movable contact member 283 with the stationary contacts 286, thus closing the circuit through the switch leads 2—35 as shown in the electrical diagrams Figs. 23 and 24, to start the spindle motor.

As has been stated, in accordance with another feature of the present invention, a novel and improved plugging switch is employed for electrically reversing the table motor which is arranged upon operation of the stopping switch to operate uniformly and efficiently to electrically reverse and brake the motor and table driven thereby to a stop, and thereafter to cut off the motor without causing the motor to mechanically reverse or kick in an opposite direction.

The plugging switch employed, as best shown in Figs. 11, 14 and 15, comprises a viscosity switch of new and improved construction which is mounted directly on the armature shaft 138 of the motor, and is particularly well adapted for smooth and efficient operation at the relatively high speed of rotation attained by the shaft. The viscosity switch employed comprises two drum-shaped members 310 and 312 rigidly secured by means of a clamping nut 314 to the reduced end of the shaft 138 to rotate therewith, and a hollow drum or band 316 which is fitted over the drums 310 and 312, and is provided internally with a central rib 318 which projects between and is supported by roller bearings 320 on the reduced end portion of the armature shaft 138. The lower portion of the inner drums 310 and 312 and outer drum 316 are immersed in an oil bath provided within a casing 322 which surrounds the end of the armature shaft 138. As best shown in Fig. 14, the central bottom portion of the outer drum or band 316 is cut away to provide access of the oil to the rotating drums 310 and 312. The outer drum or band 316 is provided across its upper periphery with a bracket 324 on which is supported a lug 326 adapted for engagement alternatively with switch contact plungers 328 and 330 as the outer drum or band 316 is rotated in one direction or the other by the movement of the oil film set up by the rapidly rotating drums 310 and 312. The switch contact plunger 328 is provided with movable contacts 332 which are arranged for engagement alternatively with the stationary contacts 334 and 336. A compression spring 338 coiled about the switch plunger 328 tends normally to hold the plunger in an advanced position with the contacts 332 in engagement with the stationary contacts 336. The contact plunger 330 is similarly provided with movable contacts 340 which engage alternatively with the stationary contacts 342 and 344, being normally held in engagement with the contacts 344 by means of a compression spring 346. With the construction and mode of operation of the switch disclosed, it will readily be seen that a relatively slow rotation of the shaft 138 and the drums 310 and 312 will operate to set up an oil film between the peripheral surfaces of these drums and the inner peripheral surface of the drum 316, which will operate to rotate the drum and lug 326 mounted thereon to operate one or the other of the switch plungers 328 or 330 against the pressure of the relatively light springs 338 or 346 to operate the switches. The increased speed of rotation of the shaft 138 as the motor is brought up to speed cannot in any way affect the integrity or efficiency of the oil film, inasmuch as it is positively maintained within the inner peripheral surface of the drum 316, so that the drum is maintained at all times in the required angular position until the motor and armature shaft 138 are again brought substantially to a standstill, when the pressure of the switch plunger spring becomes effective to return the switch drum 316 to its neutral position.

In accordance with one feature of the present invention, a switch lock has been provided for the table viscosity switch above described, controlled by means of a solenoid, and adapted to prevent overtravel of the switch mechanism when the table motor is plugged to a stop. Without the switch lock the plugging switch operating at a relatively slow rate of speed would depend on the centering springs 338 and 346 for this purpose. It has been found, however, that while the strength of the centering springs may be adjusted to cause the contacts of the viscosity switch to open at predetermined speed to determine the point of stopping of the motor, variations in temperature and consequently of the viscosity of the oil will vary the action of the springs sufficiently to produce errors in the point of stopping, and may even tend to set up an oscillatory condition whereby the rocking motion of the viscosity switch would control the motor reverse contactors in such a manner as to continue its own rocking action indefinitely. With the present construction, the tension of the centering springs is made sufficiently light so that the contacts will always open at or near zero speed of the table motor. There is also provided a latch 350 which is adapted when rendered operative to move into the path of a plate 352 mounted on the bracket 324, and thus to prevent the movement of the switch drum 316 beyond its neutral position, as illustrated in Fig. 15. The latch 350 is mounted in the lower end of an armature shaft 354 of a solenoid 356 supported directly above the viscosity switch. The solenoid operates normally while energized to maintain the latch 350 in retracted inoperative position, and acts when de-energized to permit the armature shaft and latch 350 to drop into the path of the plate 352. The operation of the solenoid 356 is controlled by means of electrical connections hereinafter described, being energized at all times during the operation or reversing of the table, and being de-energized only by the pressing of one of the stop buttons and consequent dropping out of the contacts 2—17 of the secondary relay coil LR or RR (see Figs. 23 and 24) to stop the operation of the table.

The cutter spindle 84 is driven from the spindle motor 94 through driving connections which include a bevel gear 360 rigidly secured to the spindle 84, and a bevel pinion 362 meshing therewith which is secured to one end of a short shaft 364 set at right angles to the spindle 84. A pick-off gear 366 supported on the other end of the shaft 364 engages with a pick-off gear 368 supported on a stub shaft 370 which also carries a gear 372 arranged to mesh with a pinion 374 mounted on the armature shaft 376 of the spindle motor 32.

There is also supported on the armature shaft 376 of the motor 94, a mechanical braking device which comprises a circular frame or hub 378 keyed to turn with the armature shaft 376 and having formed thereon external gear teeth to mesh with corresponding internal gear teeth of a flat braking ring 380 which is fitted between a stationary flange 382 which forms a part of the motor casing, and a movable braking disk 384 which is keyed against rotational movement by the engagement of external gear teeth formed in the disk with corresponding internal gear teeth formed on the internal periphery of the casing. In order to apply a braking force to arrest the rotation of the motor shaft 376, the movable braking disk 384 is moved axially to frictionally engage the rotating brake disk or flange 382 between the stationary flange 382 and the disk 384. To this end the movable disk 384 is screw-threaded to a post 386 which is rotatably mounted in bearings formed in the end plate 388 of the support 86. The angular position of the post 386 is determined to control the application of the brake by means of a lever arm 390 secured thereto, which is connected at its free end by means of a short link 392, to the armature shaft 394 of a solenoid 396. A tension spring 398 connected at one end to the lever arm 390 and at its other end to a pin 400, tends to move the lever arm 390 in a clockwise direction, as shown in Fig. 19, to set the brake. During the operation of the spindle motor, the solenoid 396 is energized to move the arm 390 in a counterclockwise direction against the pressure of the spring 398 to release the brake.

In accordance with one feature of the present invention, electrical connections have been provided for electrically reversing or plugging the spindle motor 94 substantially to a stop, and thereafter for de-energizing the brake solenoid 396, so that the spindle is first considerably retarded by the electrical braking action of the motor itself, and the mechanical brake is then utilized to completely stop and to maintain the spindle in stationary position with a minimum of wear upon the brake itself. To this end a viscosity plugging switch, as best shown in Figs. 16, 21 and 22, has been mounted on the armature shaft 376 of the motor. This switch, which is similar in many respects to that above described in connection with the table motor, comprises two drums 402 and 404 secured to turn with the motor shaft 376, and a switch drum 406 which is mounted thereon and has formed on its inner periphery a rib 408 which extends between the drums 402 and 404 into engagement with a roller bearing 410 on the motor shaft 376. The lower portions of the drums 402 and 404 and switch drum 406 are immersed in an oil bath provided in the motor casing. The switch drum 406 is provided on its upper side with a lug 412 to which is secured one end of a switch plunger 414 which carries the movable contacts 416 arranged for engagement alternatively with the stationary contacts 420 and 422. The switch drum 406 and switch plunger 414 are normally maintained in a neutral inoperative position by a spring balancing device comprising a rod 424 which is connected at one end to the lug 412 and extends through a stationary sleeve 426 and two coil springs 428 and 430 which are coiled about the rod 424 at each side of the stationary sleeve 426, and tend normally to maintain the switch drum 406 and switch plunger 414 in the intermediate position illustrated in Figs. 21 and 24. The centering springs 428 and 430 are preferably adjusted with a light tension to cause the contacts to be opened at or near the zero speed of the spindle motor, the action of the mechanical brake above described being sufficient to prevent the undesirable oscillating or rocking of the motor above described in connection with the table viscosity switch.

Another feature of the machine illustrated in the drawings, consists in a take-up device to maintain a tight working engagement between the feed nuts and the feed screw of the table drive, together with means for easing off this mechanism during the quick traverse operation of the table. This mechanism is similar in many respects to that illustrated in the copending application of Graves and Bennett, Serial No. 714,808, filed March 9, 1934, for Machine tools, but may be briefly described in connection with Figs. 10, 11 and 13 of the drawings. As previously pointed out, the table is driven through connections which comprise the feed screw 170 secured to the table and the feed nuts 168 which are driven in unison from the driving gear 166. In order to take up any lost motion which may exist between the feed screw 170 and nuts 168, a cam member 425 is sleeved on the hub of one of the feed nuts 168 between a roller bearing formed integrally with the hub of the nut 168 and a cooperating cam face 427 formed on one of the stationary bearings for the nut. The position of the cam member 425 is controlled by means of a rock shaft 429 which has formed on one end thereof a pinion arranged to mesh with a gear segment formed on the lower side of the cam member 425. On the other end of the shaft 429 there is provided an arm 431 which is operatively connected to a control rod 433 secured to move vertically with the armature 190 of the quick traverse clutch solenoid 188. The arm 431 is forked to extend at either side of the rod 433, and is engaged from above by the fixed collar 435 and from below by a spring-pressed collar 437. With this construction the downward movement of the armature 190 and control rod 433 to shift the quick traverse clutch to quick traverse position positively rocks the shaft 429 and arm 431 to ease off the take-up device. The upward movement of the control rod 433 with the armature 190 to return the clutch to the slow feed position illustrated in Fig. 13, causes the arm 431 and shaft 429 to be rocked in an opposite direction to take up any lost motion between the feed screw 170 and feed nuts 168 against the pressure of the spring-pressed collar 437.

The construction and operation of the electrical connections for controlling the operation of the table and the cutter spindle respectively through their driving motors will be briefly described in connection with the electrical wiring diagram Fig. 23 and the explanatory diagram Fig. 24 so far as necessary to make clear the connection therewith of the several new and improved features of construction and operation of the machine above set forth.

The table driving motor and spindle driving motor are driven from a three-phase power line designated as $L^1$, $L^2$ and $L^3$. The table motor is controlled by means of a reversing switch having two exciting relays L and R.

The main switch for the table motor is supported on a panel indicated in dotted lines at 432 in Fig. 23, and comprises two sets of contacts which are controlled by the relay coils R and L respectively to connect the motor and table for right or left hand operation. A high speed and low speed switch for the table motor is mounted on a second panel indicated at 434 in dotted lines, and comprises two sets of contacts controlled respectively by the relay coils HS and LS for high speed or low speed operation of the table motor.

On another panel indicated at 436 in dotted lines, are carried the main switch contacts for the spindle motor 94 controlled by means of two relay coils SF and SR for opposite directions of rotation of the motor and spindle driven thereby.

There are also provided on a panel 438 designated in dotted lines in Fig. 23, three secondary relay switches which are arranged to control the operation of the table and spindle switches above described, together with the solenoid 288 which operates the slow feed and quick traverse clutch 264. These secondary relays comprise the secondary coils LR and RR controlled respectively by the left and right feed buttons, the coils TL and TR controlled respectively by the left and right quick traverse buttons, and a secondary relay coil RC which controls the operation of the slow feed and quick traverse solenoid 188, and also has connections which are arranged under certain operating conditions to control the operation of the high speed table motor and the spindle motor switches.

Starting with the machine at rest, pressing the feed left button will energize the LR coil, so that the LR contacts 2—24 open, LR contacts 4—7 close, forming a holding circuit, the LR contacts 2—18 close energizing the main contactor coil L starting the motor, LR contacts 2—17 close to energize the latch solenoid 356 in the table viscosity switch, and LR contacts 2—31 close to energize SF coil and thus start the spindle motor. The starting of the table motor causes the switch drum 316 of the table motor viscosity switch to swing to the right as shown in Fig. 15, carrying with it the switch contact members 340, opening the switch 6—23 and closing the switch 24—25. Similarly, the starting of the spindle motor upon the energizing of the SF coil will cause the switch drum 4—6 of the spindle motor viscosity switch to move to the left as illustrated in Fig. 21, carrying with it the switch contacts 416 to close the switch plugging contacts 2—32. The energizing of the SF coil simultaneously causes the SF contacts 32—33 to open. The pressing of the feed right button will operate similarly to start the machine with the table moving to the right.

Assuming the table is feeding left with the coils LR, L and SF energized, and the table viscosity switch contacts 22—6 and 24—25 closed, and that it is desired to stop the machine by pressing the stop left button, the operation of the electrical connections is as follows:—The pressing of the stop left button de-energizes the coil LR so that LR contact 2—18 opens dropping out of the main contactor L, LR contact 2—24 closes and establishes a circuit to the main contactor coil R through viscosity switch contacts 24—25, thus electrically reversing or plugging the table motor, LR contacts 2—31 open, but the spindle contactor is held in through the SF interlock 29—31 and L or R interlock 2—29, and LR contacts 2—17 open, de-energizing the solenoid 356 in the viscosity switch so that the latch 350 is permitted to drop into the path of the bar 352. When the motor has practically stopped, the switch contacts 24—25 are opened by the movement of the switch drum 316 back to its central neutral position under the influence of the spring 346, being, however, prevented from moving beyond this point by the engagement of the latch 350 with the bar 352 on the switch drum 316. The opening of the contacts 24—25 de-energizes the main contactor L, thus disconnecting the table motor. Interlock 2—29 controlled by the L coil disconnects the spindle contactor SF. Inasmuch as the contacts 2—32 of the spindle viscosity switch are closed, the de-energizing of the SF coil causes the SF contacts 32—33 to close, thus energizing the SR coil which operates to electrically reverse or plug the spindle motor. When the motor reaches a reasonably low speed, the spindle plugging switch contacts 2—32 open, disconnecting the SR coil which in turn disconnects the spindle motor and the brake solenoid 396 to permit the application of the mechanical brake.

Assuming that it is desired to operate the table at a quick traverse rate to the left from a rest position, the pressing of the fast left button will energize the TL coil. The TL contacts 10—7 close and energize the LR coil. TL contacts 20—21 and 21—22 close and energize the coil RC through plugging switch contacts 22—6. The closing of the circuit through the RC coil acts through the contacts L 2—70 to energize the slow feed and quick traverse clutch solenoid 288 to shift the clutch to quick traverse position. RC contacts 31—35 open preventing the spindle from starting, unless the spindle selector switch having contacts 31—35 is in continuous position. RC contacts 26—6 also open to de-energize the contactor coil LS, and RC contacts 2—27 close to energize the high speed coil HS, if this coil has not been previously energized by the operation of the mercury switch indicated in Figs. 23 and 24. The closing of the relay coil LR starts the table motor in the manner previously outlined in connection with starting from rest to feed left.

If it is now desired to stop the machine operating to the left at a quick traverse rate, the pressing of the stop left button will operate as follows:—At this time the coils LR, TL, L, RC and the quick traverse clutch solenoid 288 are energized. Pressing the stop button de-energizes LR and TL. The energizing of the LR relay in conjunction with the viscosity switch plugs the table motor to rest in a manner previously outlined in stopping from feed. The opening of TL contacts 20—21 de-energizes the relay RC. The RC contacts 31—35 close, but the spindle is prevented from starting during this plugging period, since the LR relay has been de-energized and the spindle motor interlocks 29—31 which open.

Assuming now that the table is operating at a slow feed to the left and that it is desired to shift to a quick traverse rate to the right, the contactors LR, L and SF are closed as well as the table motor viscosity switch motor contacts 24—25 and 22—6. The pressing of the fast right button will energize the coil TR. TR contacts 15—12 close, energizing coil RR, and TR contacts 21—23 and 20—21 close, but viscosity switch contacts 6—23 are opened, so that the relay coil RC is not energized at this time, RR contacts 2—4 open, de-energizing the LR relay which in turn de-energizes the main contactor coil L, RR contacts 13—12 close forming a holding circuit through the LR contacts 2—13 which also close, and RR contacts 2—25 close to energize the main contactor R, electrically reversing the table motor. When the motor has practically stopped, the viscosity switch contacts 23—6 are closed by the movement of the switch motor 340 and switch drum 316 to their neutral position under the pressure of the spring 346 as illustrated in Fig. 15 to energize the relay coil RC. The energizing of the RC relay operates as above described to energize the slow feed and quick traverse solenoid 288, disconnects the spindle motor, and shifts the table motor from slow speed to high speed as above described.

If it is now desired to shift from a rapid traverse to the left to a rapid traverse to the right, the relay coils LR, TL, L, RC and HS and the clutch solenoid 188 being energized as above described, the pressing of the fast right button energizes TR causing TR contacts 20—21 to close, holding the RC relay in through its interlock 21—6, and TR contacts 12—15 close energizing the relay coil RR. The RR contacts 2—4 open de-energizing the relay coil LR, RR contacts 13—12 close, forming a holding circuit, and RR contacts 2—25 close to energize the R coil after the LR contacts 2—18 have released the main contactor coil L.

The invention having been described, what is claimed is:

1. In a milling machine, the combination of a power driven member, driving connections therefor including a reversible electric motor and a shaft directly driven thereby, a switch controlling mechanism for controlling the operation of said motor and member driven thereby including starting, stopping and reversing switch contacts, a viscosity plugging switch mounted on said shaft having a central stop position and alternative operating positions controlled by the direction of rotation of the motor, centering springs for said viscosity switch, and mechanical means rendered operative in plugging the motor to rest to positively arrest the return movement of the viscosity switch under the influence of the springs in stop position.

2. In a milling machine, the combination of a power driven member, driving connections therefor including a reversible electric motor and a shaft directly driven thereby, a switch controlling mechanism for controlling the operation of said motor and member driven thereby including starting, stopping and reversing switch contacts, a viscosity plugging switch mounted on said shaft having a central stop position and alternative operating positions controlled by the direction of rotation of the motor, centering springs of a strength to cause the viscosity switch to return to central stop position at or near zero speed of rotation of the motor, and mechanical means rendered operative in plugging the motor to rest to positively arrest the return movement of the viscosity switch under the influence of the springs in stop position.

3. In a milling machine, the combination of an operating tool, a work supporting table movable to position work with relation to said tool, driving connections for the table including a reversible motor, a switch control mechanism for controlling the operation of said motor and table including starting, stopping and reversing switch contacts, a viscosity plugging switch for the motor having a central stop position and alternative operating positions controlled by the direction of rotation of the motor, means tending to maintain said viscosity switch yieldingly in stop position, and mechanical means rendered operative in plugging the motor to rest to positively arrest the return movement of the viscosity switch in stop position.

4. In a milling machine, the combination of an operating tool, a work supporting table movable to position work with relation to said tool, driving connections for the table including an electric motor, and a switch control mechanism for controlling the operation of said motor and table including starting, stopping and reversing switch contacts, a viscosity plugging switch for the motor having a central stop position and alternative operating positions controlled by the direction of rotation of the motor, means tending to maintain the viscosity switch yieldingly in stop position, a solenoid, a plunger controlled thereby adapted when rendered operative to lock the viscosity switch against a return to the alternative operating position, and means for controlling the operation of said solenoid in stopping the machine to prevent overtravel of the switch mechanism in plugging the motor to a stop.

5. In a milling machine, the combination of an operating tool, a work supporting table movable to position work with relation to said tool, driving connections for the table including an electric motor, switch control mechanism for controlling the operation of said motor and table including starting, stopping and reversing switch contacts, a viscosity plugging switch for the motor having a central stop position and alternative operating positions controlled by the direction of rotation of the motor, means tending to maintain the viscosity switch yieldingly in stop position, a solenoid, a plunger controlled thereby arranged when rendered operative to engage with and prevent the return of the viscosity switch from one to the other of said alternative operating positions, and electrical connections to said solenoid rendered operative in stopping the machine to cause said plunger to engage with and prevent the movement of said viscosity switch to its alternate operating position in plugging the motor to a stop.

6. In a milling machine, the combination of an operating tool, a work supporting table movable to position work with relation to said tool, driving connections for the table including an electric motor, switch control mechanism for controlling the operation of said motor and table including starting, stopping and reversing switch contacts, a viscosity plugging switch for the motor having a central stop position and alternative operating positions controlled by the direction of rotation of the motor, means tending to maintain the viscosity switch yieldingly in stop position, mechanism acting when rendered operative to engage with and prevent the movement of the plugging switch past said stop position from one to the other of its alternative operating positions, and means rendered operative by the actuation of said stopping switch contacts to render said mechanism operative to prevent the return of said switch past stop position.

7. In a machine tool, the combination of a power driven member, driving connections therefor including an electric motor and a shaft directly driven thereby, and electrical switch connections for controlling the operation of the motor including a viscosity plugging switch comprising a drum secured to rotate with said shaft, a switch control band surrounding and mounted to turn freely with relation to said drum, means tending yieldingly to maintain said band in a predetermined stationary angular position, means for supplying oil to the periphery of said drum to move the band in the direction of rotation of the drum, and a switch member connected to said band arranged to be closed by the movement of said band from said stationary position.

8. In a machine tool, the combination of a power driven member, driving connections therefor including an electric motor and a shaft directly driven thereby, and electrical switch connections for controlling the operation of the motor including a viscosity plugging switch comprising a drum secured to rotate with said shaft, a switch control band surrounding and mounted to turn freely with relation to said drum, means tending yieldingly to maintain said band in a predetermined stationary angular position, means for supplying oil to the periphery of said drum to move the band in the direction of rotation of the drum, and a switch member connected to said band having neutral and alternative operating positions controlled by the direction of movement of said band under the influence of the oil between the band and rotating drum.

9. In a machine tool, the combination of a power driven member, driving connections therefor including an electric motor and a shaft directly driven thereby, and electrical switch connections for controlling the operation of the motor including a viscosity plugging switch comprising a drum secured to rotate with said shaft, a switch control band surrounding and mounted to turn freely with relation to said drum, means tending yieldingly to maintain said band in a predetermined stationary angular position, an oil bath in which said drum is partially immersed to supply oil to the periphery of said drum, and a switch member connected to said band and having a central neutral position corresponding to said stationary position of said band and alternative operating positions determined by the movement of the band in opposite directions under the influence of the oil flow between the band and rotating drum.

10. In a machine tool, the combination of a power driven member, driving connections therefor including an electric motor, a mechanical brake for the motor, a switch controlling mechanism including a motor stopping switch, electrical connections controlled by said switch for electrically braking the motor to rest, means controlled by said switch for applying said mechanical brake, and control means for actuating said brake, and control means for actuating said means to set the brake only as the motor reaches substantially a stop position.

11. In a milling machine, the combination of a power driven member, driving connections therefor including a reversible electric motor, a mechanical brake for the motor, a switch controlling mechanism including a motor starting and stopping switch, a motor plugging switch for electrically reversing and plugging the motor to a stop, electrically actuated means for controlling the operation of the brake, and electrical connections rendered operative in stopping the motor to cause said means to set the brake only as the motor reaches substantially a stop position.

12. In a milling machine, the combination with a work supporting table, of a rotary tool spindle, a motor connected to drive the spindle, a mechanical brake for the motor, electrical connections for controlling the brake, and an electrical control system comprising a starting and stopping switch for the motor, a motor plugging switch having operating and neutral rest positions for electrically reversing and plugging the motor to a stop, and means controlled electrically by said plugging switch and rendered operative by the return of said plugging switch to neutral position to set the brake as the motor reaches substantially stop position.

13. In a milling machine, the combination with a work supporting table, a rotary tool spindle, a reversible spindle motor connected to drive the spindle, a mechanical brake for the motor, spring means tending to set the brake, a brake solenoid arranged when energized to maintain the brake in off position against the pressure of the spring, and electrical connections controlling the operation of the motor including starting, stopping and reversing switch contacts, a plugging switch having a central stop position and alternative operating positions controlled by the direction of rotation of the motor, means tending to maintain said plugging switch yieldingly in rest position, and connections arranged upon the return of the plugging switch to stop position to de-energize the solenoid and set the brake at substantially zero speed of rotation of the motor.

14. In a milling machine, the combination with a work supporting table, of a rotary tool spindle, a motor connected to drive the spindle, a mechanical brake arranged when rendered operative to brake the motor and spindle connected thereto, a switch controlling mechanism including a spindle motor stop switch, electrical connections controlled by said switch for electrically braking the motor to rest, means controlled by the movement of said switch for applying said mechanical brake, and control means for actuating said means to set the brake only as the motor reaches substantially stop position.

15. In a milling machine, the combination with a work supporting table, of a rotary tool spindle, a motor connected to drive the spindle, a mechanical brake arranged when rendered operative to brake the motor and spindle connected thereto, a brake solenoid arranged when energized to maintain the brake in off position, electrical connections for controlling the motor including a plugging switch for electrically reversing and plugging the motor to a stop, and electrical connections to de-energize the brake solenoid simultaneously with the release of the plugging switch as the motor is slowed to rest.

16. In a milling machine, the combination with a work supporting table, of a rotary tool spindle, a spindle motor connected to drive the spindle, a mechanical brake for the motor and spindle, spring means tending to set the brake, a brake solenoid arranged when energized to maintain the brake in off position against the pressure of the spring, electrical connections for controlling the operation of the motor including a plugging switch for braking the motor to rest, and connections arranged upon the cutting off of the motor current simultaneously to de-energize said brake solenoid.

17. In a machine tool, a movable support, an electric motor driving connections including a plurality of parallel operating shafts, a set of intermeshing pick-off gears mounted thereon through which the support is driven from the motor, a casing within which said gears are housed, a casing cover, a motor stop switch, a locking device for the cover, and connections between the motor stop switch and the locking device arranged to prevent movement of the locking device to release the cover while the switch is in running position.

18. In a machine tool, a movable support, driving connections including a plurality of parallel operating shafts, a set of intermeshing pick-off gears fitted into the adjacent ends of said shafts through which the support is driven, a casing within which said gears are housed, a casing cover, and spring means supported by said cover to engage with and maintain said gears in operating position on said shafts.

19. In a machine tool, a movable support, driving connections including a plurality of parallel operating shafts, a set of intermeshing pick-off gears fitted into the adjacent ends of said shafts through which the support is driven, a casing within which said gears are housed, a casing cover, and means supported by said cover in closed position to engage with and maintain said gears in operating position on said shafts.

20. In a machine tool, a movable support, driving connections including a plurality of parallel operating shafts, a set of intermeshing pick-off gears mounted thereon through which the support is driven from the motor, a casing within which said gears are housed, a casing cover, and spring-pressed plungers supported by said cover adapted with said cover in closed position to engage with and maintain said gears in operating position on said shafts.

21. In a machine tool, a movable support, driving connections including a plurality of parallel operating shafts, a set of intermeshing pick-off gears mounted on the adjacent ends of said shafts, a casing within which said gears are housed, a casing cover, supporting pins within said cover for storing additional gears, said pins having substantially axial alignment with the corresponding operating shafts, and spring means supported on said pins arranged for the closed position of said cover to engage between and maintain said operative and stored gears respectively in position.

22. In a machine tool, a movable support, driving connections including a plurality of parallel operating shafts through which the support is driven, a set of intermeshing pick-off gears mounted on the adjacent ends of said shafts, a casing within which said gears are housed, a casing cover, supporting pins within said cover for storing additional gears, said pins having substantially axial alignment with the corresponding operating shafts, plungers seated within said pins to engage with pick-off gears operatively supported on said shafts, and spring means engaging respectively with said plungers and with said stored gears to maintain said operative pick-off gears and said stored gears yieldingly in operating position.

23. In a milling machine, the combination of a rotary tool spindle, a work supporting table movable to position the work with relation to said spindle, driving connections for the table including an electric motor, a spindle driving motor, and a switch control mechanism for controlling the operation of the machine including starting, stopping and reversing switch contacts for each of said motors, and a manually operable stop switch for the table motor comprising a manually operable stop button connected to said table motor stop switch contacts, means acting automatically to lock said stop button when pressed in stop position, a manually operable reset button, and a connection actuated by said reset button to release said locking means and reset said manually operable stop button in open position.

24. In a milling machine, the combination of a rotary tool spindle, a work supporting table movable to position the work with relation to said spindle, a reversible electric motor connected to drive the table, motor switches for starting, stopping and reversing the motor, a secondary circuit for controlling the operation of said switches including starting, stopping and reversing control switch connections and a plugging switch cooperating therewith for controlling the operation of said motor switches for plugging the motor to a stop, and a safety stop switch connected to said motor stop switch to disconnect the motor independently of said plugging switch.

25. In a milling machine, the combination of an operating tool, a work supporting table movable to position the work with relation to said tool, driving connections for the table including a reversible motor, a plurality of parallel operating shafts, intermeshing pick-off gears mounted thereon through which the support is driven from the motor, a casing within which said gears are housed, a casing cover, switch connections for starting, stopping and reversing the motor including a plugging switch controlled by the rotation thereof for plugging the motor to rest, a safety stop switch to electrically disconnect the motor independently of said plugging switch connections, a locking device for the cover, and means controlled by the actuation of the locking device to release the cover simultaneously to open said safety stop switch.

26. In a milling machine, the combination of an operating tool, a work supporting table movable to position the work with relation to said tool, driving connections for the table including a reversible motor, a plurality of parallel operating shafts, intermeshing pick-off gears mounted thereon through which the support is driven from the motor, a casing within which said gears are housed, a casing cover, switch connections for starting, stopping and reversing the motor including a plugging switch controlled by the rotation thereof for plugging the motor to rest, a manually operable stop switch for the table motor comprising a manually operable stop button, a locking device for the cover, and a mechanical interconnection between said stop button and locking device arranged to permit the actuation of the locking device to release the cover only upon the actuation of said stop button.

27. In a milling machine, the combination of an operating tool, a work supporting table movable to position the work with relation to said tool, driving connections for the table including a reversible motor, a plurality of parallel operating shafts, intermeshing pick-off gears mounted thereon through which the support is driven from the motor, a casing within which said gears are housed, a casing cover, switch connections for starting, stopping and reversing the motor including a plugging switch controlled by the rotation thereof for plugging the motor to rest, a manually operable stop switch for the table motor comprising a manually operable stop button, a locking device for the cover, and a mechanical interconnection between said stop button and locking device arranged to permit the actuation of the locking device to release the cover only upon the actuation of said stop button, a safety stop switch to electrically disconnect the motor independently of said plugging switch connections, and means controlled by the actuation of the locking device to release the cover simultaneously to open said safety stop switch.

28. In a milling machine, the combination of an operating tool, a work supporting table movable to position the work with relation to said tool, driving connections for the table including a reversible motor, a plurality of parallel operating shafts, intermeshing pick-off gears mounted thereon through which the support is driven from the motor, a casing within which said gears are housed, a casing cover, a locking device for said cover, switch connections for starting, stopping and reversing the motor including a plugging switch controlled by the rotation thereof for plugging the motor to rest, a manually operable stop switch for the table motor comprising a manually operable stop button, a mechanical interconnection between said cover locking device and said stop button to prevent the release of the cover for the open position of said stop button, means acting automatically to lock said stop button when pressed in stop position, and simultaneously to release said cover locking device, and a manually operable reset button arranged simultaneously to reset said stop button in open position and to lock the cover locking device.

29. In a machine tool, the combination of a tool support, a work support, driving means including a reversible electric motor for reciprocating one of said supports, electrical controls for controlling the operation of the table comprising slow feed and quick traverse circuits for moving said support in either direction, a plugging switch having a rest position and alternative driving positions corresponding to reverse directions of operation of the motor, said switch comprising a plugging contactor in the feed circuit for each direction of travel of the motor and a quick traverse contactor in each of said quick traverse circuits for each direction of travel of the motor, said switch being arranged for the rest position thereof to maintain the plugging switch contactors open and the quick traverse contactors closed, and for either driving position to close the plugging switch contactor in the feed circuit reverse to that of the direction of rotation of the motor and to open the quick traverse switch contactor in the circuit reverse to that of the direction of rotation of the motor, means controlled by the direction of rotation of the motor to control the position of said switch, and means tending yieldingly to return said switch to rest position at substantially zero speed of rotation of the motor.

30. In a milling machine, the combination of a power driven member, driving connections therefor including a reversible electric motor and a shaft directly driven thereby, a switch controlling mechanism for controlling the operation of said motor and member driven thereby including starting, stopping and reversing switch contacts, a viscosity plugging switch mounted on said shaft having a central stop position and alternative operating positions controlled by the direction of rotation of the motor, plugging switch contacts for each direction of rotation of the motor controlled by the position of said viscosity plugging switch for the rest position thereof to maintain said plugging switch contacts open and for either driving position of said viscosity switch to close the plugging switch contact corresponding to the direction of rotation of the motor, and means tending yieldingly to return said viscosity switch to stop position at substantially zero speed of rotation of said motor and shaft driven thereby.

31. In a milling machine, the combination of a power driven member, driving connections therefor including a reversible electric motor and a shaft directly driven thereby for driving said member in opposite directions, a slow feed and quick traverse clutch, a solenoid for controlling the position of said clutch, a switch controlling mechanism for controlling the operation of said motor and solenoid comprising slow feed, quick traverse and stopping switch contacts, a viscosity plugging switch mounted on said shaft having a central stop position and alternative operating positions controlled by the direction of rotation of the motor, means tending yieldingly to return said viscosity switch to stop position at substantially zero speed of rotation of the motor and shaft driven thereby, and switch connections controlled by said viscosity switch to permit the operation of said solenoid to shift the clutch to quick traverse position in a reverse direction only upon return of said viscosity switch to stop position.

32. In a machine tool, a driven member, driving connections therefor including a prime mover, a plurality of operating shafts, a set of intermeshing pick-off gears mounted thereon through which the member is driven, a casing within which said gears are housed, a casing cover, a control element movable to render said driving connections alternatively operative and inoperative to drive said member, and connections between said control element and cover arranged to prevent opening of the cover except when the control element is in a position rendering said driving connections inoperative.

33. In a machine tool, a driven member, driving connections therefor including a prime mover, a plurality of operating shafts, a set of intermeshing pick-off gears mounted thereon through which the member is driven, a casing within which said gears are housed, a casing cover, a control element movable to render said driving connections alternatively operative and inoperative to drive said member, and connections between said control element and cover arranged to prevent movement of said control element to a position rendering said driving connections operative while the cover is open.

34. In a machine tool, a driven member, driving connections therefor including a prime mover, a plurality of operating shafts, a set of intermeshing pick-off gears mounted thereon through which the member is driven, a casing within which said gears are housed, a casing cover, a control element movable to render said driving connections alternatively operative and inoperative to drive said member, a locking device for said cover, and connections between the control element and locking device arranged to prevent movement of the locking device to unlock the cover while the control element is in a position rendering the driving connections operative.

35. In a machine tool, a driven member, driving connections therefor including a prime mover, a plurality of operating shafts, a set of intermeshing pick-off gears mounted thereon through which the member is driven, a casing within which said gears are housed, a casing cover, a control element movable to render said driving connections alternatively operative and inoperative to drive said member, a locking device for said cover, and connections between the control element and locking device arranged to prevent movement of the control element to a position rendering said driving connections operative while the locking device is in a position permitting opening of the cover.

36. In a machine tool, a driven member, driving connections therefor including a prime mover, a plurality of operating shafts, a set of intermeshing pick-off gears mounted thereon through which the member is driven, a casing within which said gears are housed, a casing cover, a control element movable to render said driving connections alternatively operative and inoperative to drive said member, a locking device for said cover, and connections between the control element and locking device arranged to prevent movement of the locking device to unlock the cover while the control element is in position rendering the driving connections operative, and arranged to prevent movement of the control element to a position rendering said driving connections operative while the locking device is in a position permitting opening of the cover.

ARTHUR F. BENNETT.
AUGUST L. KRAUSE.